INVENTOR.
M.S. Firnhaber
BY
Morsell + Morsell
Attorneys

July 25, 1967   M. S. FIRNHABER   3,332,758
APPARATUS FOR MANUFACTURING GLASS FIBERS
Filed June 21, 1963   3 Sheets-Sheet 2

INVENTOR
M. S. Firnhaber
BY
Morrell & Morrell
Attorneys

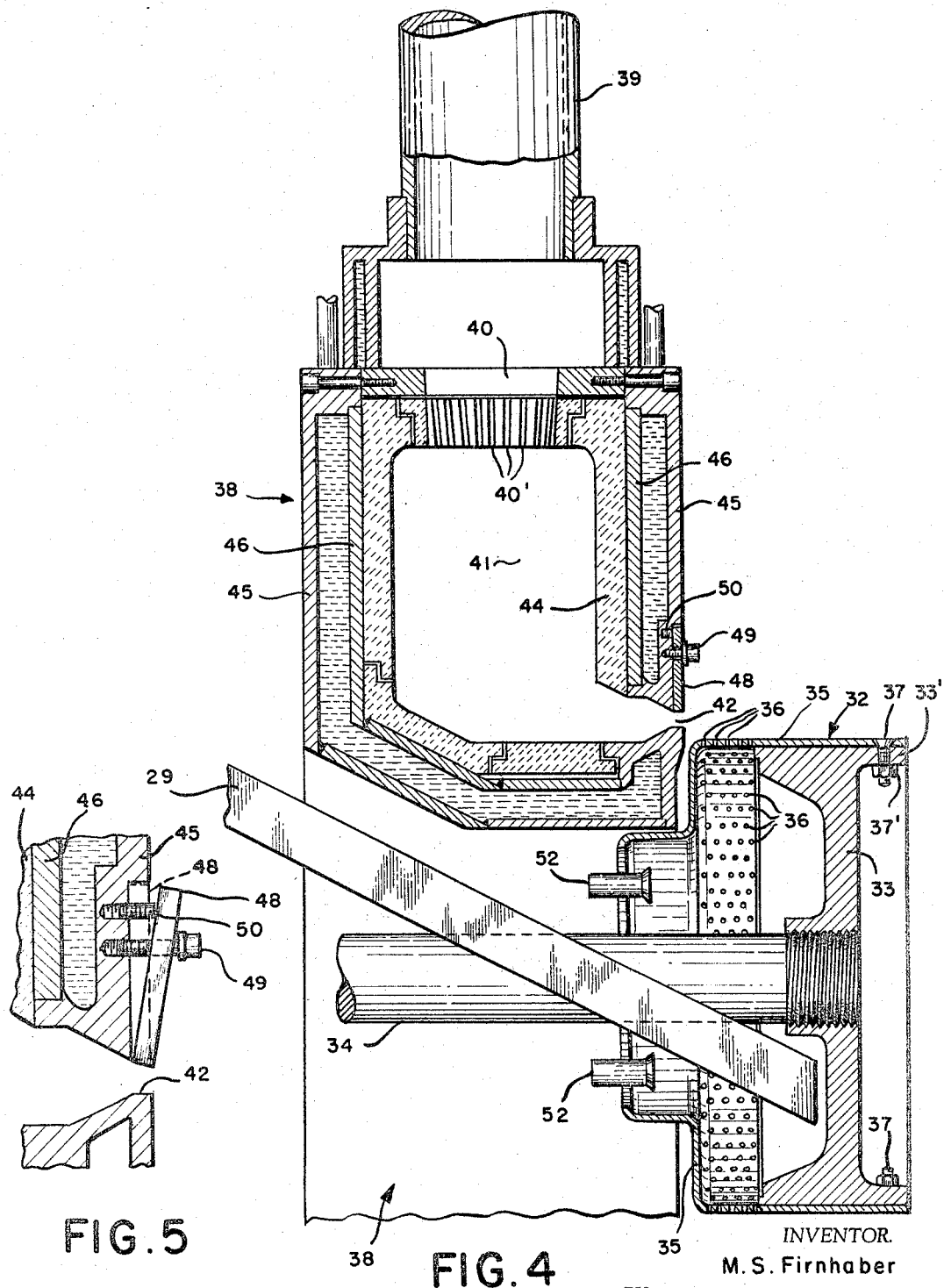

United States Patent Office 3,332,758
Patented July 25, 1967

3,332,758
APPARATUS FOR MANUFACTURING
GLASS FIBERS
Miles S. Firnhaber, Rte. 3, Pewaukee, Wis. 53072
Filed June 21, 1963, Ser. No. 289,691
6 Claims. (Cl. 65—14)

This invention relates to an improved apparatus for and method of manufacturing glass fibers.

Heretofore, glass fibers have been made by melting a silica batch in a special glass melting tank, and then delivering the molten glass to a rapidly spinning rotor which forms the same into fibers. It has long been recognized, however, that such melting tanks are relatively inefficient and costly in operation, as compared to a conventional cupola such as is used in the manufacture of mineral wool, and wherein the utilization of heat is much more efficient. Unfortunately, when a glass batch is melted in a cupola the molten glass tends to smother the coke bed and retard combustion, with the result that the glass emitted from the cupola is not homogeneous, containing unmelted silica particles and particles of carbon and other foreign matter, and which product is unsuitable for use in manufacturing glass fibers.

With the above in mind, the general object of the present invention is to provide a novel apparatus and method of producing glass fibers of fine quality wherein the glass batch is melted in a conventional cupola, in place of the special melting tanks heretofore employed, and with resulting advantages in efficiency and economy.

A more specific object of the present invention is to provide a novel glass melting apparatus and method wherein a special forehearth is utilized in association with a conventional cupola, which forehearth is adapted to receive the incompletely melted glass batch from the cupola and to further refine the same to produce a homogeneous product of desired quality and characteristics.

A further object is to provide a complete fiber-forming assembly including a special, improved fiberizing apparatus which is designed to receive molten glass from the forehearth and to form the same into fine fibers of unusually excellent quality and consistency.

Still further objects of the invention are to provide an improved apparatus and method of forming glass fibers which is relatively inexpensive in design and construction, which is simple and reliable in operation, and which is otherwise particularly well adapted for its intended purposes.

With the above and other objects in view, which other objects and advantages will appear hereinafter, the present invention consists of the improved apparatus and method disclosed in the following specification, and all of the parts, combinations, and steps recited in the claims, and any and all equivalents thereof.

In the accompanying drawings, wherein there is shown a complete embodiment of a preferred form of the apparatus employed in the present invention, and wherein the same reference numerals designate the same parts in all of the views:

FIG. 4 is an enlarged fragmentary vertical sectional view through the rotor and burner assembly; and FIG. 5 is an enlarged sectional and side elevational view of the gas burner discharge adjustment mechanism.

Figure 1:
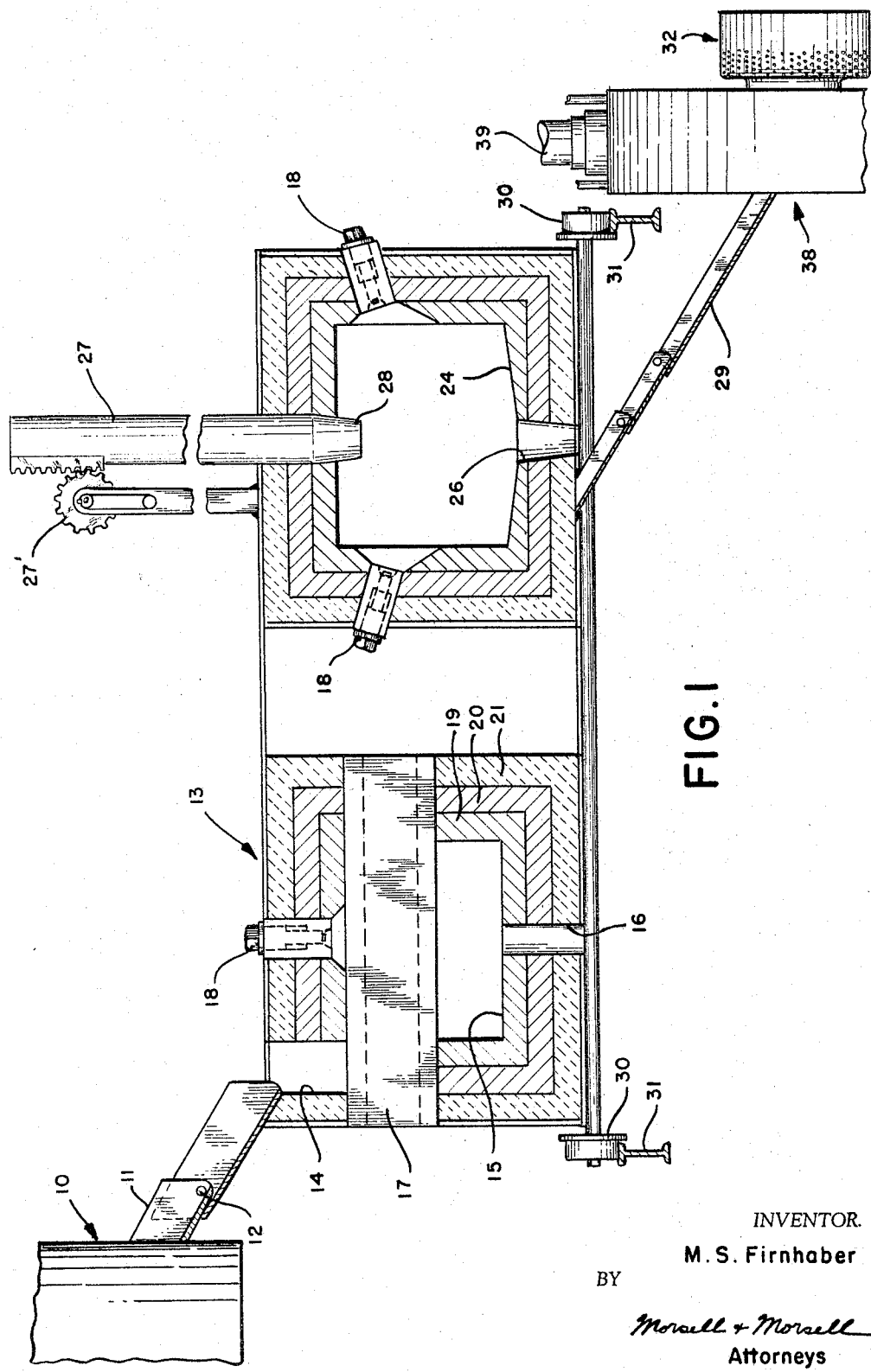
FIG. 1 is a fragmentary side elevational view of the complete apparatus, and showing the forehearth in longitudinal vertical section, as taken along line 1—1 of FIG. 2.

Referring now more particularly to FIG. 1 of the drawings, the numeral 10 designates a cupola of the conventional type utilized in the production of mineral wool and similar products wherein the slag is used. As hereinabove mentioned, a cupola is the most efficient and economical melting device available, but it has not heretofore been possible to utilize the same in the manufacture of glass fibers because the glass batch tends to smother the coke bed and retard combustion, thus resulting in a non-homogeneous product having particles of unmelted silica, carbon, and other foreign matter, and which product is unsuitable for use in the manufacture of glass fibers. In accordance with the present invention, however, there is associated with said cupola a novel forehearth, which is designated generally by the numeral 13, which is designed to further refine the batch to a homogeneous material of desired quality, temperature, and viscosity. Communicating with the interior of the cupola is an elongated discharge chute 11 which is designed to direct the glass batch from said cupola into an inlet opening 14 in said forehearth 13. Said chute 11 is preferably formed in two sections, hinged as at 12, to permit the same to be shifted to a non-pouring position, or to divert the flow.

Figure 2:
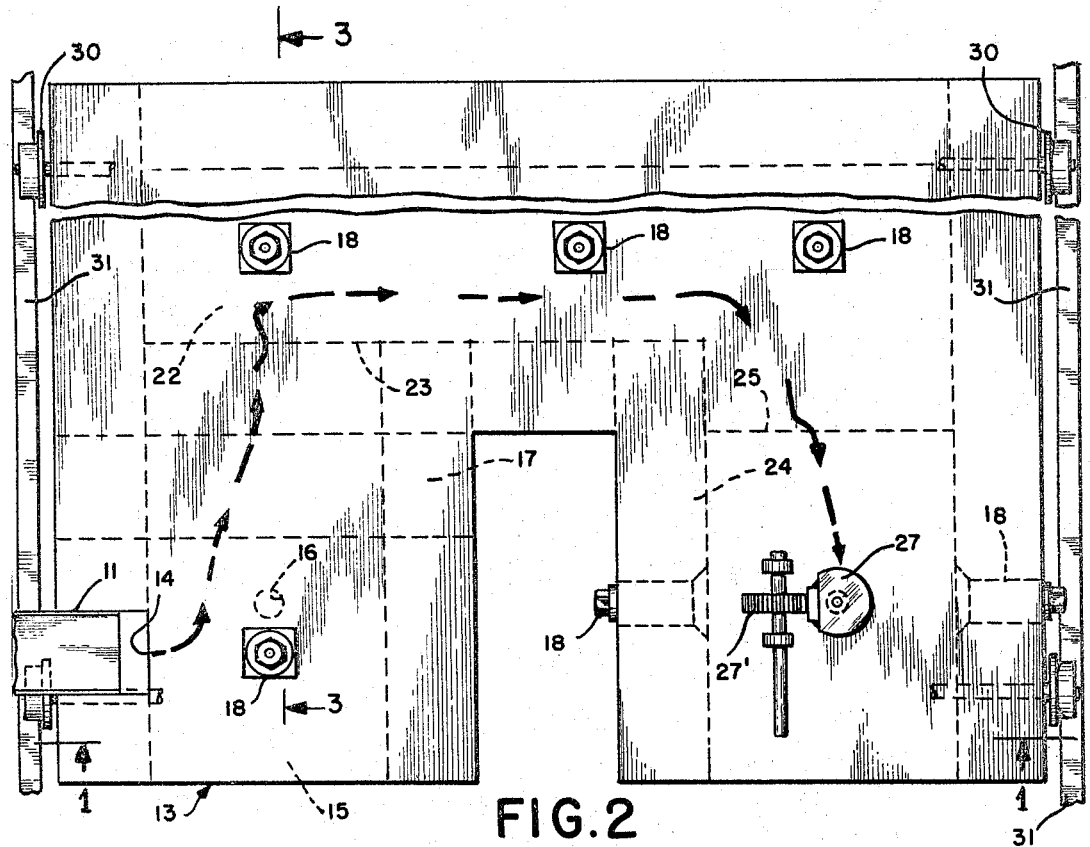
FIG. 2 is a top plan view of the forehearth.
Figure 3:
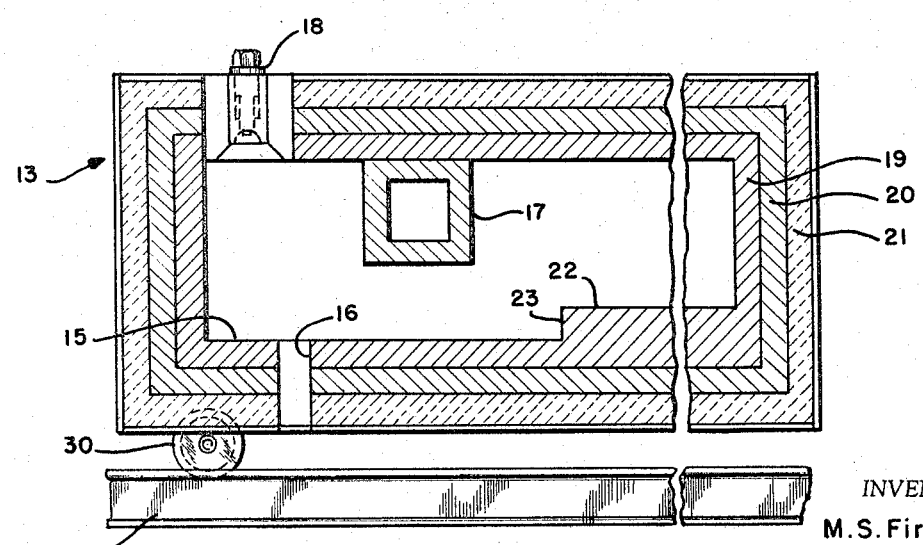
FIG. 3 is a transverse vertical sectional view through the forehearth, taken along line 3—3 of FIG. 2.

As will be seen in FIGS. 1, 2 and 3, the novel forehearth 13 characterizing the present invention comprises a horizontal, U-shaped housing (FIG. 2), and provided therein is a first puddling area or channel 15 which communicates with the inlet opening 14. Said first channel is preferably approximately twelve inches in depth and is provided with a bottom drainhole 16 through which the heavier impurities and sludge which settle toward the bottom of the molten glass flowing into said channel are discharged.

Communicating with and arranged at a right angle to said channel 15 is a second channel 22 which is elevated about two inches above the level of said first channel to form a step 23 (FIG. 3). As the molten material flows from the channel 15 to said second channel 22, the course of said material being shown by arrows in FIG. 2, the step 23 therebetween functions to trap heavy particles of foreign matter and prevents the same from continuing through the forehearth with the molten glass. A skimmer block 17 is also mounted in said communicating channels, extending transversely across the upper portion thereof, and is designed to skim the impurities off the top of the molten glass as the liquid flows thereunder. As illustrated, said skimmer block 17 extends completely through said forehearth section and is hollow to permit cooling air to pass therethrough.

Communicating with the channel 22 in the U-shaped forehearth is a channel 24 which is parallel to the first channel 15, and which is also elevated to provide a step 25 (FIG. 2) designed to trap any remaining particles or foreign matter. As will be seen in FIG. 1, said channel 24 is provided with a bottom which slopes downwardly to a discharge orifice 26.

Vertically-adjustably mounted on top of the forehearth 13 and projecting downwardly in alignment with the discharge orifice 26 is a needle valve 27 and ratchet adjustment mechanism 27', which needle valve may be fully or partially inserted into said orifice to regulate the discharge rate of the molten glass. In its preferred form, said needle valve is provided with a tip 28 formed of platinum or similar material adapted to withstand intense heat.

A plurality of radiant burners 18, or similar heating elements are mounted in and spaced around the novel forehearth incorporated in the present invention and are designed to direct heat against the liquid glass as the latter travels through said forehearth to maintain said molten material at a desired temperature and viscosity. Normally, it has been found that excellent results are obtained when the liquid in the first channel 15 is maintained at approximately 2500° F. and then progressively reduced as it travels through the forehearth to a temperature of approximately 2150° F. in the discharge area. Thermocouples or other suitable, well known temperature-responsive instruments are employed to regulate said burners and to automatically maintain the glass temperature at the desired levels. The molten glass emitted from the forehearth 13 in the present invention is substantially devoid of unmelted particles or impurities, and is well adapted for use in making glass fibers of high quality and consistency.

As mentioned, the forehearth 13 is U-shaped in form, to provide maximum travel distance for the molten glass flowing therethrough, in a minimum of space, and in the illustrated construction said forehearth includes an outer wall 21 of firebrick or other insulation material, an intermediate wall 20 of zircon or similar refractory, and an inner wall 19 which is preferably formed of chrome refractory. The entire forehearth is provided with wheels 30 and is mounted on tracks 31, thus permitting said forehearth to be readily pushed out of the way in the event it is desired to use the cupola for producing mineral wool or other materials wherein the forehearth is not required.

It is to be understood, of couse, that the present invention is not to be limited or confined to a melting assembly including a forehearth exactly as shown and described herein. What is novel is the concept of utilizing a forehearth in conjunction with a cupola to produce molten glass suitable for manufacturing glass fibers, and the invention is intended to include not only the illustrated forehearth design, but also any and all modifications thereof as come within the spirit of said invention.

With reference again to FIG. 1 of the drawing, communicating with and extending downwardly from the forehearth discharge orifice 26 is a chute 29. Said chute is formed in hinged sections, and is arranged to direct the molten material emitted from said forehearth against the inner, concave face of a fiberizing rotor 32, the hinged design of said chute permitting the same to be angularly adjusted as desired.

As appears in FIG. 4, said rotor 32 includes a base portion 33 having a rearwardly-projecting flange 33', and bolted thereto is an annular, apertured rim 35 which projects forwardly from said base. Unlike conventional glass-fiberizing rotors, the rotor 32 in the present invention is mounted on a horizontal drive shaft 34, there being a suitable prime mover (not shown) for spinning said rotor at a high speed. The use of a horizontally-driven rotor has several advantages over the vertical drive type of rotor heretofore used in the manufacture of glass fibers. A larger rotor can be utilized with a horizontal drive shaft, and the distribution of the fibers is more uniform than that obtained with a vertical-type rotor. Moreover, and particularly important, it is easier to convert to the production of mineral wool and other fibrous products which are ordinarily formed on a rotor of the horizontal shaft type.

The apertures 36 in said rim 35 are preferably approximately 1/32" in diameter, and the inner portion of said rim is deflected radially inwardly at a right angle and then forwardly, as illustrated, to provide a forwardly-opening face through which said forehearth delivery chute 29 projects. Said rim is secured to the rotor base by means of bolts 37 which are projected through the base annular, rearwardly-projecting flange 33', there being retaining nuts 37' therefor. The purpose of this flanged mounting arrangement is to pemit air to continuously contact both sides of said connecting bolts 37 during operation to prevent the overheating and possible fusion of said metal members, thus facilitating the removal of said retaining bolts in the event it should be desired to replace the rim.

In operation, the molten glass delivered from the forehearth 13 and directed onto the concave face of the rotor 32 is thrown centrifugally from said spinning rotor, said glass passing through the minute apertures 36 and being formed thereby into filaments or fibers. In the preferred form of the invention, burners 52 are positioned to direct heat or flames against the face of the rotor to maintain the molten glass thereon at the proper temperature and viscosity during operation. As the glass fibers leave the periphery of the rotor they are intercepted by a forcible blast of gas emitted from a stationary burner ring 38 surrounding said rotor, which blast functions to abruptly and violently change the direction of said filaments and to attenuate the same into long, fine fibers of the type desired.

With reference still to FIG. 4 of the drawing, it will be seen that the improved burner ring 38 utilized in the present invention includes a supply pipe or conduit 39 which is designed to deliver a mixture of gas and air under pressure to said burner ring, said mixture being directed through the plenum 40 and tubes 40' into a combustion chamber 41. Said gas mixture burns and expands within the chamber 41, and is discharged at a high velocity through a circular slotted opening 42 adjacent and surrounding the periphery of the rotor 32. The interior of said burner ring attains a temperature of approximately 3000° F., and to prevent structural damage said ring includes spaced outer walls 45 and 46 having a liquid coolant therebetween, and the combustion chamber liner 44 is formed of a refractory material, thus providing an improved high-velocity burner which is designed to withstand extreme temperatures, and which is particularly well adapted for its intended purpose.

Another novel and improved feature incorporated in the burner 38 in the present invention is the structural means therein for adjusting the width of the discharge opening 42, and to thereby regulate the volume and velocity of the blast emitted therefrom. As will be seen in FIGS. 4 and 5, mounted on the burner outer wall 45 adjacent and forming the upper margin of the discharge slot 42 is a plate 48, there being a plurality of identical individual plates 48 formed in abutting relationship around the circumference of said circular discharge slot. Said plates are removably secured on said burner outer face by screws 49, and a set screw 50 is adjustably threaded into the burner wall beneath and adjacent the upper edge portion of each of said plates. To adjust the size of the blast opening 42, it is merely necessary to remove the retaining screws 49 from said plates 48, and to turn the set screws 50 thereunder outwardly as desired. Then, by re-installing said plate members 48 and retaining screws 49 said plates are caused to tilt inwardly, as shown in full line in FIG. 5, with the result that their lower edges angle inwardly and in restricting relationship to the slot 42. Thus the width of said discharge slot 42 may be easily modified to adjust the force of the blast emitted therethrough.

From the foregoing detailed description it will be seen that the present invention provides a novel apparatus and method for forming glass fibers wherein a conventional cupola is employed in place of the special melting tanks heretofore utilized, with resulting advantages in efficiency and economy, and wherein an improved fiberizing assembly is provided to produce fibers of unusually excellent quality and consistency. Moreover, the improved apparatus hereinabove described is relatively simple in design and construction, and it is reliable in operation.

It is to be understood, of course, that the present invention is not to be limited to an apparatus and method exactly as illustrated and hereinabove described. On the contrary, it is intended to include herein not only the illustrated apparatus and method, but also any and all modifications or changes therein as may come within the spirit of said invention, and within the scope of the following claims.

What I claim is:

1. In an apparatus for producing glass fibers, the combination comprising a cupola for melting glass batch, a forehearth positioned to receive molten glass together with unmelted silica particles, carbon particles and other foreign matter from said cupola, means in said forehearth adapted to further refine said molten glass and to remove said particles and foreign matter from the molten glass to render cupola melted glass suitable for delivery to a fiberizing means, and power driven fiberizing means positioned to receive molten glass from said forehearth and adapted to form said molten glass into fibers, wherein said forehearth includes a housing which is U-shaped in plan view to provide first and second leg portions with a connecting portion therebetween, said first leg having an inlet opening and having a horizontal channel communicating with said inlet opening, which channel has a drain hole to allow discharge of settled foreign matter, a skimmer block positioned to skim foreign matter from the top of molten glass flowing through said channel of said first leg portion, a second horizontal channel in said connection portion of the housing communicating with said first channel and elevated thereabove, a third channel in said second leg portion communicating with and elevated above said second channel, a plurality of heating elements positioned to direct heat against molten glass flowing through said channels to maintain said glass at a predetermined temperature and viscosity, said third channel having a discharge opening.

2. The combination as recited in claim 1 in which there is valve means associated with said discharge opening internally of the forehearth for controlling the flow of molten glass through the discharge opening.

3. In an apparatus for producing glass fibers having a fiberizing rotor and having a hollow stationary burner ring surrounding said rotor and provided with an annular discharge opening positioned adjacent and surrounding the periphery of said rotor head, a plurality of flat elongated plates arranged in a circle on the outer face of said burner ring immediately adjacent said annular discharge opening, said plates having inner and outer edges with the inner edges forming marginal portions of the opening, means for removably securing said plates to the burner ring, and adjustable means for tiltably shifting the annular position of the inner edges of said plates relative to the discharge opening, said plates having such thickness that said tilting varies the effective size of said discharge opening.

4. In an apparatus for producing glass fibers, said apparatus having a forehearth for molten glass with discharge means, a power-driven shaft supported for rotation adjacent said forehearth, a rotor head fixed on said shaft, said rotor head having a base with an enlarged peripheral flange, one portion of said peripheral flange projecting in one direction from the base to form a molten glass-receiving cup positioned to receive molten glass from said discharge means of the forehearth, the other portion of said peripheral flange projecting in the opposite direction from said base to form an annular bolting flange, a rim surrounding said peripheral flange and having an apertured portion projecting in one direction beyond the cup and having an opposite portion overlapping said bolting flange, and bolts readily detachably connecting said rim to the bolting flange, there being a cooling space within said bolting flange.

5. In an apparatus for producing glass fibers, the combination comprising: a cupola for melting glass batch; a forehearth postiioned to receive molten glass from said cupola; means in said forehearth adapted to further refine said molten glass and to remove foreign matter therefrom; power-driven fiberizing means positioned to receive molten glass from said forehearth and adapted to form said molten glass into fibers, said fiberizing means comprising a rotor head mounted on a horizontal drive shaft; a gas burner positioned inwardly of and surrounding said rotor head, said burner having means for forcibly discharging gas around the periphery of said rotor head, and said gas burner means comprising a hollow, stationary ring surrounding said rotor head and having spaced outer walls with a liquid coolant therebetween, said hollow ring having a combustion chamber therein with an annular discharge opening positioned immediately adjacent and surrounding said rotor head; pipe means for directing a combustible mixture of air and gas into said ring; burner means associated with said ring for igniting an air and gas mixture in said combustion chamber; a plurality of flat, elongated plates arranged in a circle on the outer face of said burner ring immediately adjacent and forming marginal wall portions relative to said annular discharge opening, said plates having upper and lower longitudinal edges, and there being retaining screws projected through said plates intermediate their upper and lower edges to removably secure the same on and to said burner ring outer wall; and a set screw adjustably threaded into said burner ring outer wall beneath the upper edge portion of each of said plates whereby said plates may be tiltably adjusted to shift the angular position of their lower longitudinal edges relative to said discharge opening to vary the size of said opening.

6. In an apparatus for producing glass fibers, the combination comprising a cupola for melting glass batch, a forehearth positioned to receive molten glass together with unmelted silica particles, carbon particles and other foreign matter from said cupola, means in said forehearth adapted to further refine said molten glass and to remove said particles and foreign matter from the molten glass to render cupola melted glass suitable for delivery to a fiberizing means, and power driven fiberizing means positioned to receive molten glass from said forehearth and adapted to form said molten glass into fibers, in which the fiberizing means comprises a rotor head and in which there is a gas burner positioned inwardly of and surrounding said rotor head with means for forcibly discharging gas around the periphery of said rotor head and in which the gas burner includes a hollow stationary ring surrounding the rotor head and having spaced outer walls with a liquid coolant therebetween, said hollow ring having a combustion chamber with an annular discharge opening positioned immediately adjacent and surrounding said rotor head, pipe means for directing a combustible mixture of air and gas into said ring, burner means associated with said ring, a plurality of flat elongated plates arranged in a circle on the outer face of said burner ring immediately adjacent and forming marginal wall portions relative to said annular discharge opening, said plates having inner and outer edges, retaining screws extending through said plates intermediate said edges removably securing the same on the outer wall of said burner ring, and a set screw adjustably threaded into said outer wall of the burner ring beneath an outer portion of each of said plates whereby said plates may be tiltably adjusted to tilt the annular position of their inner edges relative to said discharge opening, said plates having such thickness that said tilting varies the effective size of said opening.

References Cited

UNITED STATES PATENTS

| 2,773,111 | 12/1956 | Arbeit et al. | |
| 2,949,632 | 8/1960 | Kleist et al. | 65—14 |
| 3,013,299 | 12/1961 | Owens | 65—14 X |
| 3,235,351 | 2/1966 | Powell | 65—346 X |
| 3,248,203 | 4/1966 | Cunningham | 65—346 X |

DONALL H. SYLVESTER, *Primary Examiner.*

R. L. LINDSAY, *Assistant Examiner.*